United States Patent [19]
Nishina

[11] 3,826,008
[45] July 30, 1974

[54] SNAP SLIDE CALIPERS

[76] Inventor: Shingo Nishina, 1-128, Sakado, Kawasaki, Japan

[22] Filed: Apr. 2, 1973

[21] Appl. No.: 346,873

[30] Foreign Application Priority Data
Apr. 8, 1972 Japan.............................. 47-41810

[52] U.S. Cl............... 33/147 F, 33/143 K, 33/147 J
[51] Int. Cl. .............................................. G01b 5/02
[58] Field of Search............ 33/147 H, 147 G, 147 J, 33/147 F, 147 T, 143 K, 143 J

[56] References Cited
UNITED STATES PATENTS
| | | | |
|---|---|---|---|
| 675,875 | 6/1901 | Ullmer | 33/147 F |
| 3,113,384 | 12/1963 | Keszler | 33/143 K |
| 3,266,159 | 8/1966 | Scholl | 33/147 T |

FOREIGN PATENTS OR APPLICATIONS
| | | | |
|---|---|---|---|
| 151,619 | 9/1920 | Great Britain | 33/147 T |

Primary Examiner—Louis R. Prince
Assistant Examiner—Richard R. Stearns
Attorney, Agent, or Firm—Brisebois & Kruger

[57] ABSTRACT

Repeated measurements of similar values with rapid speed are achieved by link means connecting a rigid frame freely mounted to slide on the bar of a caliper and a vernier plate slider, screw means which sets the position of the rigid frame on the bar of the caliper, means which resiliently biases the vernier plate slider away from the rigid frame and reading means actuated by relative movement between said frame and vernier plate slider.

5 Claims, 4 Drawing Figures

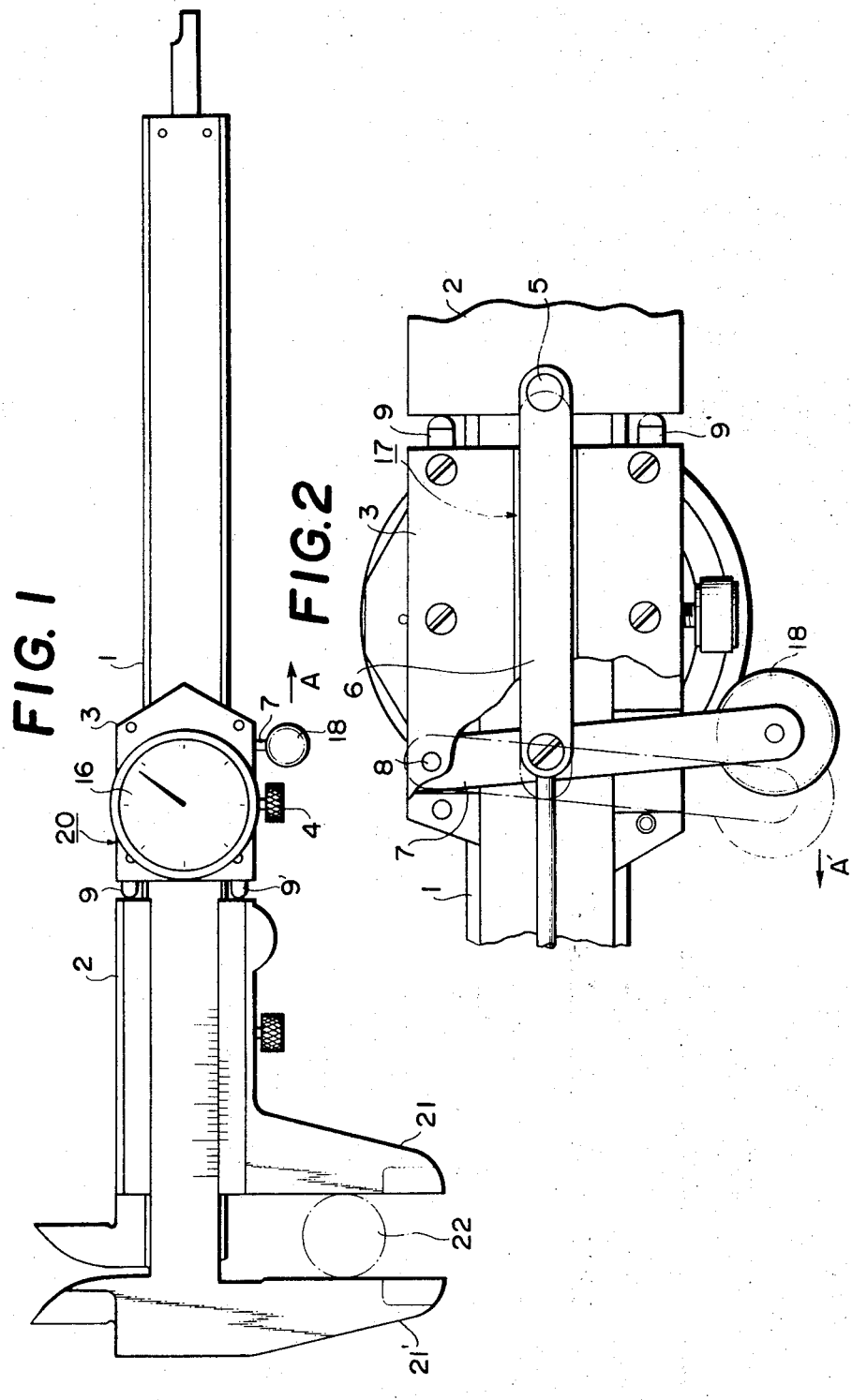

3,826,008

SNAP SLIDE CALIPERS

BACKGROUND OF THE INVENTION

1. Field of the Invention

The present invention relates to a snap caliper that can rapidly achieve repeated measurement of similar values by only providing an ordinary caliper with a simple attached device.

2. Description of the Prior Art

In general, as a similar measuring device of this kind, there is an indicating micrometer. However, such a micrometer is very costly and moreover, the operation thereof is complicated and time consuming, which makes rapid measurement thereby unsuitable and the degree of accuracy thereof is about 0.1 mm. A measuring device has been desired for quite some time in this art of measurement which measures a difference from a base value, indicates measured values of similar values by repeated measurements with a high degree of accuracy and can provide a high degree of accuracy of indicated values with rapidity and simplicity. However, such a measuring device has not been developed until now.

SUMMARY OF THE INVENTION

Therefore, an object of the present invention is to provide a snap caliper which eliminates the drawbackes mentioned above in the conventional measuring device.

Another object of the present invention is to provide a snap caliper which satisfies the above-mentioned desire. That is to say, the present invention provides a measuring device that can measure similar values with rapidity and a high degree of accuracy by using a difference from a base value.

BRIEF DESCRIPTION OF THE DRAWINGS

One embodiment of the present invention will now be described with reference to the accompanying drawings, in which:

FIG. 1 is a plan view of a snap caliper according to the present invention,

FIG. 2 is an enlarged back side view partially sectioned showing the link means and the adjacent portions of the main part of the snap caliper of FIG. 1.

DESCRIPTION OF THE PREFERRED EMBODIMENT

Figure 4:
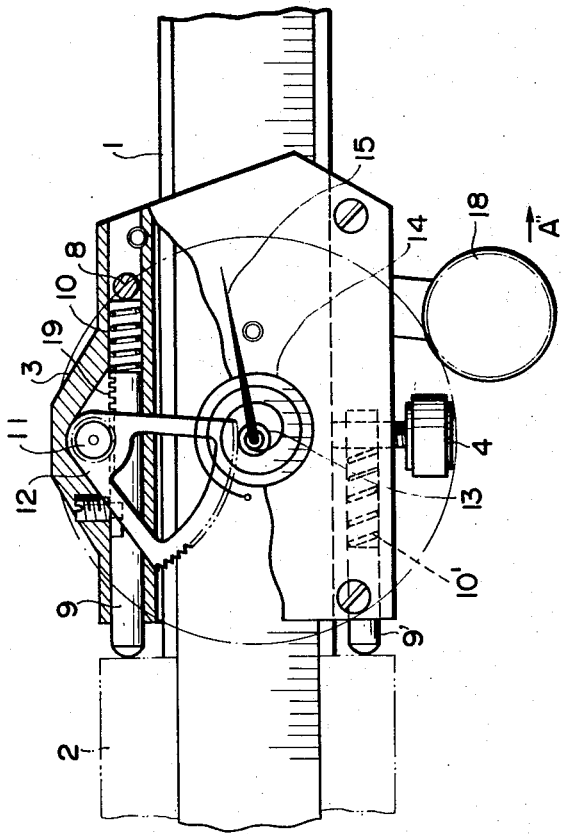
FIG. 4 is an enlarged front view partially sectioned of the part shown in FIG. 2.
Figure 3:
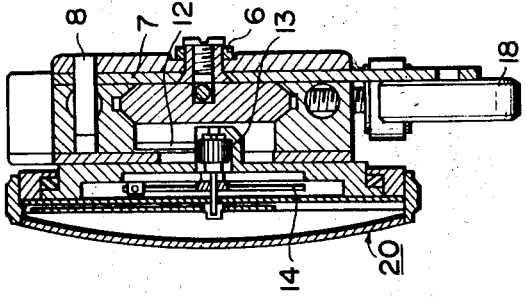
FIG. 3 is a longitudinal side sectional view of the part shown in FIG. 2.

Now, with respect to the structure, reference numeral 3 denotes a rigid frame freely mounted to slide on a bar 1 provided with a graduated scale and reference numeral 4 indicates means for fastening the rigid frame 3 to the 1. In this preferred embodiment, as the fastening means, a clamping screw is used. Further, on the bar 1 of the snap caliper, a vernier plate slider 2 is mounted to slide freely. The frame 3 and the vernier plate slider 2 are connected by a link mechanism 17 comprising a pivot pin 5 on the back surface of the vernier plate slider 2 and a link lever 6 one end of which is connected to the pivot pin 5 and the other end of which is pivotally connected to an intermediate point on a lever 7 one end of which is pivoted to rotate freely about a fulcrum 8 on the rigid frame 3. Further, the other end of the lever 7 is provided with a link operating element 18. The link mechanism is so composed that when the link operating element 18 at the other end of the lever 7 is drawn, the vernier plate slider 2 is drawn in the direction of the rigid frame 3 and when said element 18 is released, said slider 2 returns to its original position. In the rigid frame 3, a pair of springs 10, 10' are arranged opposite each other. One end of each spring is respectively supported in the rigid frame 3 while there other ends are respectively supported at respective ends of pressure pins 9, 9'. The pressure pins 9, 9' are located position at both the upper side of the vernier plate slider 2 and at the lower side thereof. As described above, the vernier plate slider 2 is so constructed as to be able to move according to drawing and releasing of the operating element 18 of the operating lever 7 in the link mechanism 17. A rack portion 19 is provided on one pressure pin 9, with which a pinion 11 is engaged. A sector gear 12 is coaxially fixed on the pinion 11, and engages a center pinion 13 of an enlarged reading means 20 such as a dial gauge. A hair spring 14 is mounted on the center pinion 13 to prevent a backlash. Besides, a needle 15 is fixed on the center pinion 13 which indicates the rotation value of the center pinion 13 in an enlarged manner on a graduated scale plate 16. The graduated scale plate 16 is manually rotatable and is made freely adustable to zero. Now, the action and operation of the snap caliper accoridng to the present invention will be explained. As shown in FIG. 1, an article of standard base dimensions 22 is clamped by a pair of jaws 21, 21' and a position of the rigid frame 3, which is link-connected to the vernier plate slider 2, against the bar 1 is determined. Then, the rigid frame 3 is fixed to the bar 1 by the clamping means 4. Thereafter zero on the graduated scale plate 16 is adjusted to the needle 15. The operating element 18 of the lever 7 is drawn by a finger, that is to say, in FIG. 1, FIG. 2 and FIG. 4 respectively, the operating element 18 is moved in the directions of the arrows, A, A', A'' and the article 22 is removed from between the pair of jaws 21, 21'. Then, an article to be measured is inserted between the jaws 21 and 21' and when the finger departs from the operating element 18, since equal forces are applied to the upper and lower ends of the vernier slide plate 2 through the pressure pins 9, 9' by springs 10, 10' one end of each being respectively fixed in the rigid frame 3, the lever 7 returns to its reference position. Then, the article to be measured is clamped correctly between the jaw 21 at the tip end of the vernier plate slider 2 and the jaw 21' at the tip end of the bar 1 by the force of said springs 10, 10' and the error from the reference position is converted and transmitted to a rotation of the pinion 11 engaging with the rack portion 19 through the rack portion 19 of the pressure pin 9. Then, the rotation of the pinion 11 is transmitted with enlargement to a center pinion 13 engaging with the sector gear 12. Thereafter, the corresponding measured value is indicated on a graduated plate by a pointer 15 mounted on the center pinion 13.

As described above, according to the present invention, repeated measurements of similar values are achieved with ease and speed by using said link mehanism with a caliper, and as at the both upper and lowe ends the difference value is received from an article to be measured and transmitted by a measuring rack, the correct value without distortion or error is transmitted to an enlarged reading means. Therefore, the indicating value with high degree of accuracy can be obtained. That is to say, the present invention effects such excellent results that a snap measurement can be measured with a high degree of accuracy by one degree lower than the ordinary indicating micrometer, and a measurement up to 0.01 mm with a reference position becomes possible only by attaching a simple device, which is a so called trigger-type gun, comprising said rigid frame and the link mechanism mounted on a caliper.

I claim:

1. In a snap caliper comprising a bar, a stationary jaw at one end of said bar, a movable jaw slidably mounted on said bar, a frame slidably mounted on said bar on the side of said movable jaw remote from said stationary jaw, and manually operable means for holding said frame in a fixed position on said bar, the improvement which comprises:

resilient means carried by one of said frame and said movable jaw lying on diametrically opposite sides of said bar and each positioned to bias said movable jaw away from said frame, an indicator comprising a pivotally mounted needle carried on said frame, and a rack mounted to move with said movable jaw and drivingly engaging said indicator to swing said needle when said movable jaw moves relative to said frame.

2. Snap caliper as defined in claim 1 comprising manually operable linkage means operatively connected to said frame and said movable jaw for moving said movable jaw toward said frame against the resistance of said resilient means.

3. Snap caliper as defined in claim 2 in which said indicator comprises a manually settable dial.

4. Snap caliper as defined in claim 1 in which said rack is biassed by said resilient means toward said movable jaw.

5. Snap caliper as defined in claim 1 in which said movable jaw carries a vernier scale cooperating with a scale on said slide.

* * * * *

UNITED STATES PATENT OFFICE
CERTIFICATE OF CORRECTION

Patent No. 3,826,008          Dated July 30, 1974

Inventor(s) SHINGO NISHINA

It is certified that error appears in the above-identified patent and that said Letters Patent are hereby corrected as shown below:

[73]   Assignee:   Yehan Numata, Yokohama City, Japan

Signed and sealed this 3rd day of December 1974.

(SEAL)
Attest:

McCOY M. GIBSON JR.                C. MARSHALL DANN
Attesting Officer                  Commissioner of Patents